United States Patent [19]

Kruegle

[11] 4,222,662
[45] Sep. 16, 1980

[54] ACCESS CONTROL SYSTEM

[75] Inventor: Herman Kruegle, Riverdale, N.J.

[73] Assignee: Visual Methods, Inc., Westwood, N.J.

[21] Appl. No.: 27,165

[22] Filed: Apr. 4, 1979

Related U.S. Application Data

[62] Division of Ser. No. 868,522, Jan. 11, 1978, Pat. No. 4,175,775.

[51] Int. Cl.³ .................. H04N 7/18; G03B 27/52; G09F 3/02
[52] U.S. Cl. ................................. 355/40; 40/2.2; 358/226
[58] Field of Search .................. 40/2.2; 358/226; 355/133, 40, 52

[56] References Cited

U.S. PATENT DOCUMENTS

| | | | |
|---|---|---|---|
| 2,397,272 | 3/1946 | Land | 40/2.2 UX |
| 3,048,697 | 8/1962 | Cavanaugh et al. | 40/2.2 X |
| 3,245,697 | 4/1966 | Nugent | 40/2.2 X |
| 3,571,957 | 3/1971 | Cumming et al. | 40/2.2 |
| 3,640,009 | 2/1972 | Komiyama | 40/2.2 |
| 3,647,275 | 3/1972 | Ward | 40/2.2 X |
| 3,755,935 | 9/1973 | Annenberg | 40/2.2 |
| 3,997,723 | 12/1976 | Sandin | 358/226 |
| 4,014,602 | 3/1977 | Ruell | 40/2.2 X |
| 4,140,373 | 2/1979 | Rüll | 40/2.2 X |

*Primary Examiner*—Donald A. Griffin

[57] ABSTRACT

A photo I.D. card having the photograph, and/or signature, and/or coded indicia of an authorized holder which is visible under ordinary room illumination also carries a second photograph of the user. The second photograph is in the form of a transparency which is sandwiched between a piece of retroreflective material and an optical filter which is opaque to light of normal intensity and wavelength but which is transparent to infra-red or ultra-violet radiation. Also disclosed is apparatus for reading both the visible and invisible photographs, signature, and data on the card by means of a CCTV system. Any attempt to alter or forge the I.D. card can, thus, be readily detected.

7 Claims, 11 Drawing Figures

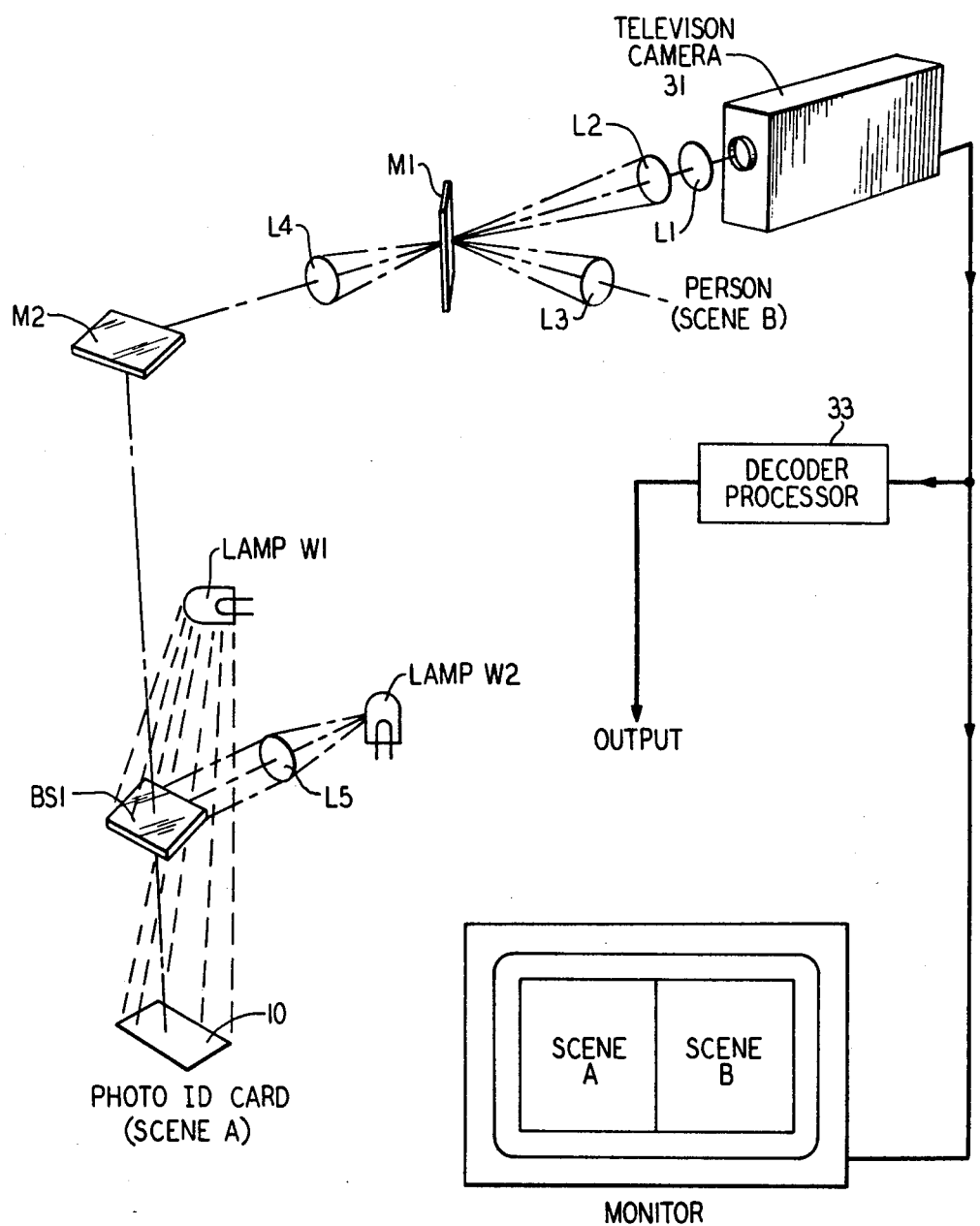

ACCESS CONTROL SYSTEM

This is a division of application Ser. No. 868,522, filed Jan. 11, 1978 now U.S. Pat. No. 4,175,775, dated Nov. 27, 1979.

BACKGROUND OF THE INVENTION (a) Field of the Invention

Broadly speaking this invention relates to personnel access control systems. More particularly, in a preferred embodiment, this invention relates to personnel access control systems to the type that employ optically-encoded identification cards and the like.

(b) Discussion of the Prior Art

The recent dramatic increases in industrial espionage, terrorism and employee dishonestly have caused many industrial and governmental organizations to carefully re-examine the security procedures by which employees, business invitees and guests are admitted to restricted premises. These studies have demonstrated that the most commonly used personnel access control technique, the conventional photo-I.D. card, is not very effective due to the relative ease by which such I.D. cards can be forged or altered, especially by experienced criminals or trained terrorists.

As a result of the limitations of conventional photo-I.D. cards, many organizations have experimented with the use of more sophisticated access control systems which typically rely on personnel descriptors such as the employee's voiceprint, finger-prints, signature, et cetera. Unfortunately, such systems are very expensive, exceedingly complex and most difficult to maintain in working condition. Further, despite their complexity, these systems do not offer the degree of security that was originally hoped for because experience has shown that the human voice can be imitated; that fingerprints can be surreptitiously "lifted" and recreated in latex; and that signatures can be forged. There is, thus, great interest in a return to the time-proven and far less expensive photo-I.D. card access control system, provided, of course, that greater immunity to card alteration can somehow be provided.

It has been suggested that the incorporation of a hidden code word or symbol within the I.D. card would make it much more difficult to forge or alter the card. Such a system would have the further advantage that if the forger were unaware that the I.D. card bore a hidden code word and merely altered the employee photograph and identification data on the card, the hidden code word could be used to detect the alteration, resulting in the immediate apprehension of the would-be intruder.

Unfortunately, heretofore the only practical way to implant a hidden code word in an I.D. card was to use some suitable magnetic recording medium, capacitance medium, or optical transmission medium. For example, a magnetic stripe buried beneath the surface of the card was commonly employed. The difficulty with this approach is that it is very easy to detect the presence of such a magnetized region and almost as easy to alter the code word stored therein. Additionally, a lost, encoded card can be used by the unauthorized card finder causing a breach in security. As a result, the return to a simpler access control system has been frustrated for want of a truly secure I.D. card.

SUMMARY OF THE INVENTION

Fortunately, the above and other problems have been solved by the instant invention which, in a preferred embodiment, comprises an improved identification card of the type that includes a first region bearing visible indicia descriptive of the authorized holder. The improvement comprises a second region bearing further visible indicia descriptive of the holder and means for inhibiting the detection of the further indicia when the further indicia are illuminated by visible radiation of normal intensity and wavelength.

The invention and its mode of operation will be more fully comprehended from the following detailed description, when taken with the appended drawings, in which:

DESCRIPTION OF THE DRAWINGS

FIG. 5 is a partially schematic, partially diagramatic drawing of the card-reader shown in FIG. 4 as modified according to the invention for use with the I.D. card shown in FIG. 1;

DETAILED DESCRIPTION OF THE INVENTION

The instant invention is based upon the discovery that high-gain retroflective materials comprise an ideal medium for secretly encoding an ordinary photo-I.D. card. Such optically encoded cards may then be interrogated by reliable and relatively inexpensive optical card readers of a type to be described below.

Figure 1:
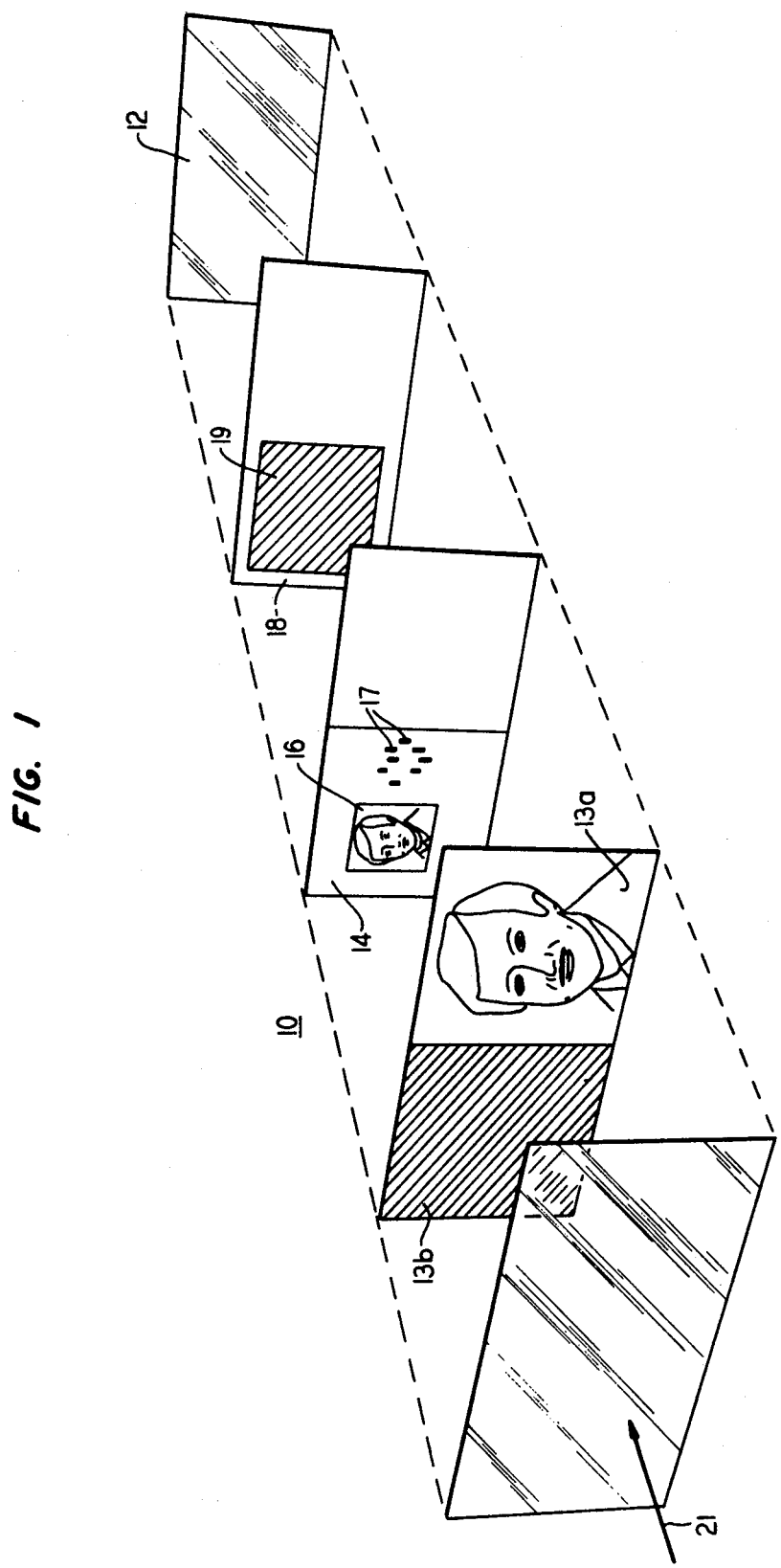
FIG. 1 is an exploded, isometric view of an illustrative photo-I.D. card according to the invention.

FIG. 1 depicts an illustrative identification card according to the invention. As shown, card 10 comprises a conventional sandwich-like structure which includes a protective, transparent front member 11 and an opaque rear support member 12. In the illustrative embodiment, three card elements are positioned between the protective member and the support member. More specifically, card element 13 comprises sub-elements 13a and 13b. Sub-element 13a includes a conventional Polaroid (r) photograph and other printed identification data identifying the employee to whom the card is issued. Sub-element 13b, on the other hand, comprises an optical filter region. Card element 14 includes a positive transparency 16 which corresponds to the photograph shown on card element 13a. Advantageously, transparency 16 also includes digitally encoded employee identification data which may comprise, for example, nonopaque regions of the transparency or suitable apertures which have priorly been punched through card member 14. It may also contain the employee's signature or other personal or alpha-numeric identification data.

Card member 18 includes a retroflective region 19 which is substantially co-extensive with the transparency and data regions 16 and 17 on card member 14. The several consituent parts of the I.D. card may be assembled into a unitary card by any of several well known techniques, for example, by lamination under conditions of controlled temperature and pressure or by use of some suitable adhesive. To prevent a build-up in the thickness of the card, the filter, transparency and retroflective material may be inserted into die-cut apertures formed in the corresponding card elements if this should prove necessary.

When light of normal intensity and wavelength is directed at card 10 in the direction shown by arrow 21, the photograph of the employee in region 13a will, of course, be readily visible to the naked eye. However, in a manner yet to be described, filter 13b will absorb virtually all of the light impinging on that region of the card and will attenuate still further that small fraction of the light that succeeds in reflecting off retroflective material 19. Thus, the casual observer who uses the unaided human eye or a standard television camera will be unable to see the second photographic image and/or signature contained within transparency 16 or the digitally encoded identification data 17 and, as a consequence, will be totally unaware of their existence. Obviously, then, a would-be forger will not attempt to alter hidden photographs 16 or the digitally encoded data 17 because he simply does not know that they exist! Further, to allay suspicion, the surface of filter region 13b can be printed with some innocuous design or company logo which does not interfere with the intended purpose of the filter. If, however, the hidden photograph, signature, and data are found, e.g. by mutilating the card, the information will be irreversibly altered, thus, preventing re-use.

Retroflective material 19 may comprise a simple mirror but advantageously comprises a high-grain retroflective material such as the glass-beaded material No. 7611 sold by the 3M Company under the tradename "ScotchLite" or the plastic corner-cube reflector material sold by the Rowland Corporation under the tradename "Refexite". These latter materials are characterized by extremely high optical gains relative to a white card, gains in excess of 3000 being typical, and a wide acceptance angle, i.e., they tolerate a high degree of angular misalignment between the light source axis and the normal to the card surface, which means that the alignment of the I.D. card in the card reader is far less critcal than when a simple mirror is used.

Filter region 13b may likewise comprise a half-silvered mirror but advantageously comprises a filter material which transmits infra-red or ultra-violet radiation but blocks substantially all visible radiation. Example of a suitable filter material is the gelatin filter #89B manufactured by the Eastman Kodak Company of Rochester, New York.

Figure 2:
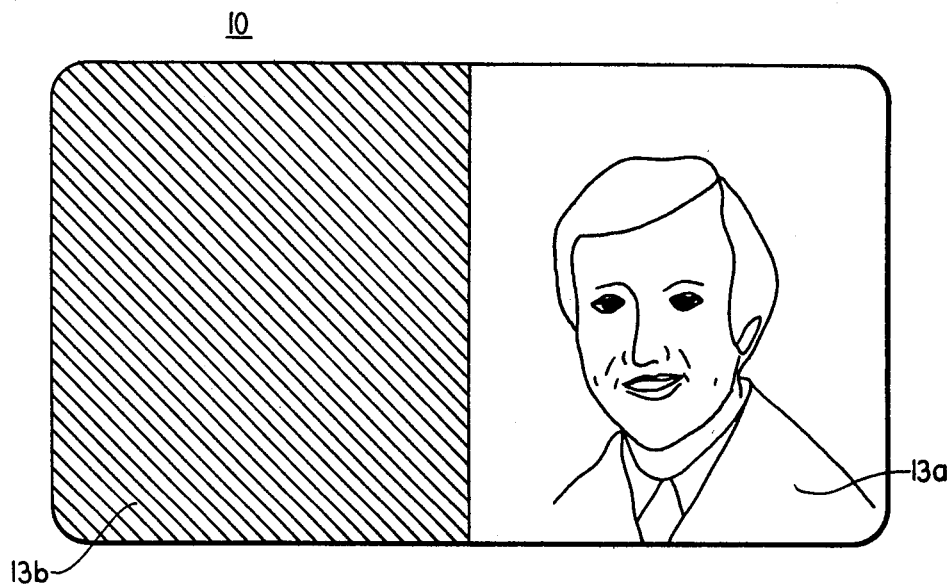
FIGS. 2 and 3 are front views of the I.D. card shown in FIG. 1 under ordinary illumination and infra-red or ultra-violet illumination, respectively.
Figure 3:
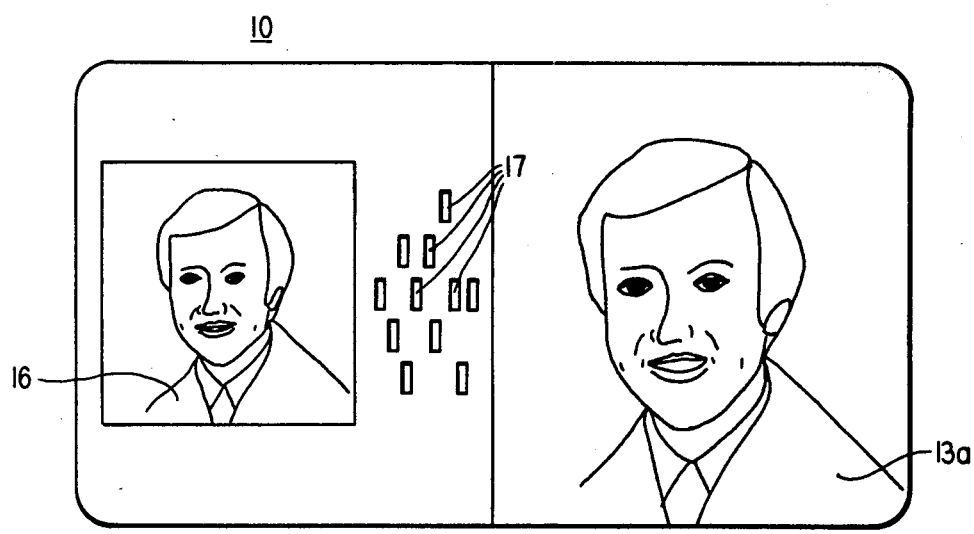

FIG. 2 depicts card 10 as it would be seen under ordinary illumination by an observer who does not have access to a suitable source of infra-red or ultra-violet radiation or card reader. FIG. 3 similarly depicts the same card as it would be seen by a security guard, for example, who does have access to a suitable card reader equipped with a source of infra-red of ultra-violet radiation. It will be self evident that any attempt to substitute another photograph for that originally present on the card is doomed to failure as the security guard will immediately detect the disparity between the visible and hidden portraits and will apprehend the would-be intruder. Likewise, any attempt to alter the employee identification or access authorization code will also fail as the attempted alteration can be easily detected by electronically reading the encoded data and either electronically or manually comparing it with the visible data. Likewise, a hidden signature or other alphanumeric identification data can be compared to its visible counterpart.

It should be noted that any attempt to separate card 10 into its constituent parts will most likely result in the destruction of the retroflective material or, at least, in a significant reduction in gain which is also readily detected by an alert guard. Further, since retroflective materials, in general, are heat sensitive, any unauthorized attempt to reseal a successfully opened card may also destroy the gain of the retroflective material which will also be detected by the guard.

Commonly assigned in U.S. Pat. No. 3,997,723, which issued on Dec. 14, 1976 to Sandin, which patent is hereby incorporated by reference as if more fully set forth herein, discloses an optical card reader which employs a CCTV camera and monitor. This card reader, when suitably modified according to the invention, may advantageously be used to card and interrogate the encoded I.D. card discussed above.

Figure 4:
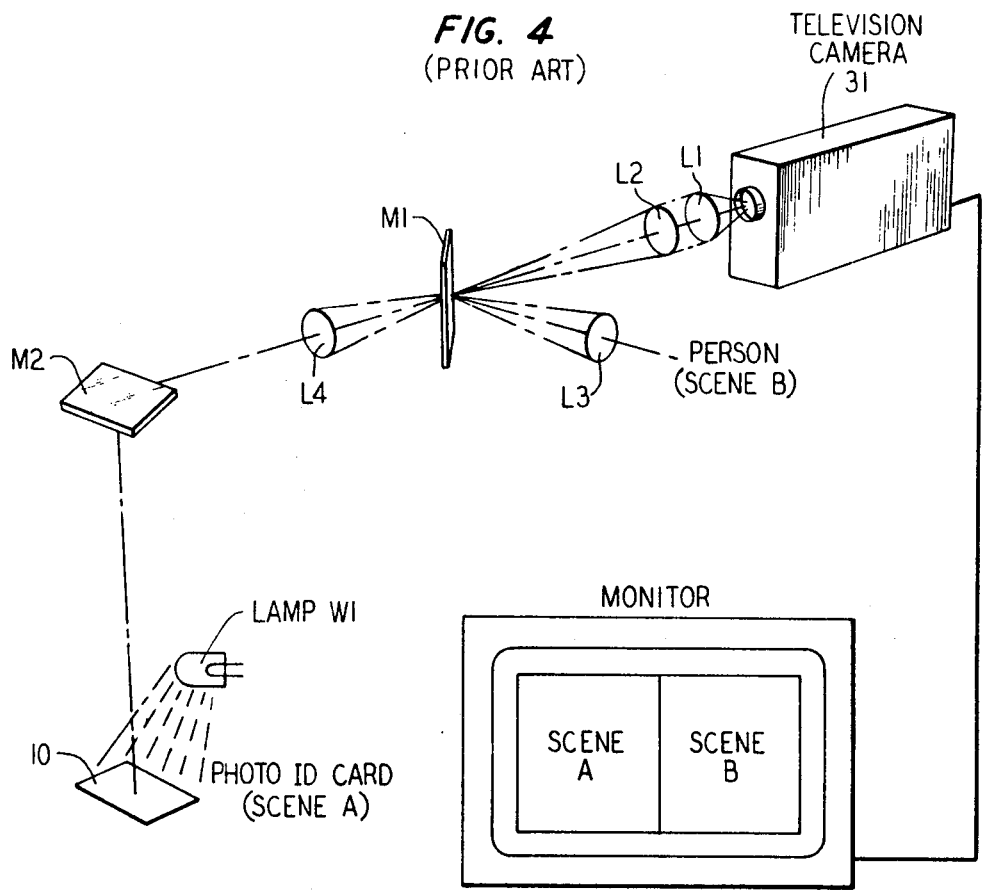
FIG. 4 is a partially schematic, partially diagrammatic drawing of a prior art optical card reader.

The card reader shown in U.S. Pat. No. 3,997,723 utilizes a TV camera and image-splitting optics to simultaneously display on a suitable monitor the I.D. card bearer and his I.D. card. FIG. 4 shows the (simplified) optical schematic of the card reader. As shown, in I.D. card 10 is illuminated by lamp W1 and sensed (imaged) by television camera 31 via mirror M2 and lenses L4, L2 and L1, respectively. The system is arranged such that the image of the I.D. card appears on one-half of monitor 32 (Scene A) while the person standing in front of the reader is sensed by camera 31 via lens L3, mirror M1 and lenses L2 and L1, respectively, and appears on the other half of the monitor screen (Scene B), both Scenes A and B being sensed and displayed simultaneously.

FIG. 5 is a (simplified) optical schematic of the modified card reader according to the invention. The modified system includes a collimated I.D. card illuminating source W2 (e.g., an infra-red or ultra-violet lamp), an additional lens L5, and a beamsplitter BS1.

In operation, radiation from lamp W2 is first collimated by lens L5, then reflected off beamsplitter BS1 to illuminate I.D. card 10 and, in particular, to illuminate retroflective region 19 (lamp W1 provides the overall illumination of the card, as before). The retroflective region in the card has the unique characteristic of reflecting the collimated light from lamp W2 directly back towards the source. The light is thereby transmitted to mirror M2, lenses L4, L2 and L1 to the television camera which advantageously is sensitive to I.R. or U.V. radiation. The high optical gain of the retroflective material permits camera 31 to clearly read the encoded data and photographic transparency despite the fact that filter 13b has a very high optical loss in the visible spectrum.

Figure 6:
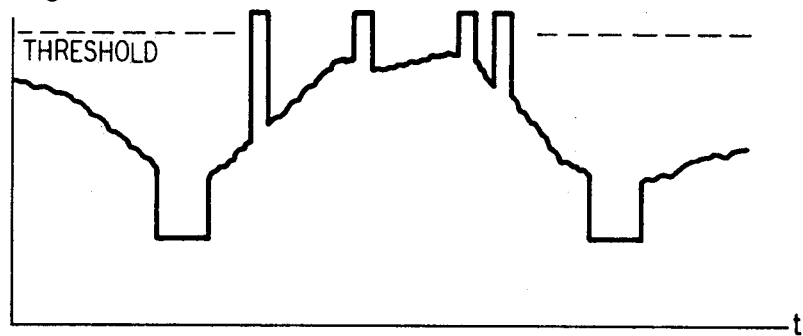
FIGS. 6 and 7 are graphs which depict the waveform at the output of the CCTV camera and decoder/processor shown in FIG. 5 as the TV camera scans across the I.D. card.
Figure 7:
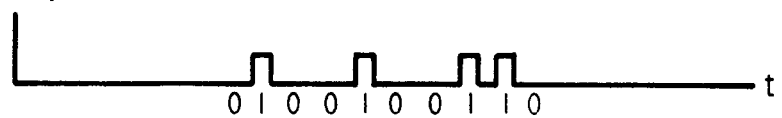

The encoded data on card 10 may be decoded and processed in a digital computer 33, e.g., a microprocessor, by any of several known techniques. For example, as shown in FIG. 6, the video scan line corresponding to that portion of the television picture which is viewing the encoded digital data on the card may be thresholded then read into the computer for analysis as a conventional digital signal, for example, as shown in FIG. 7.

Figure 8:
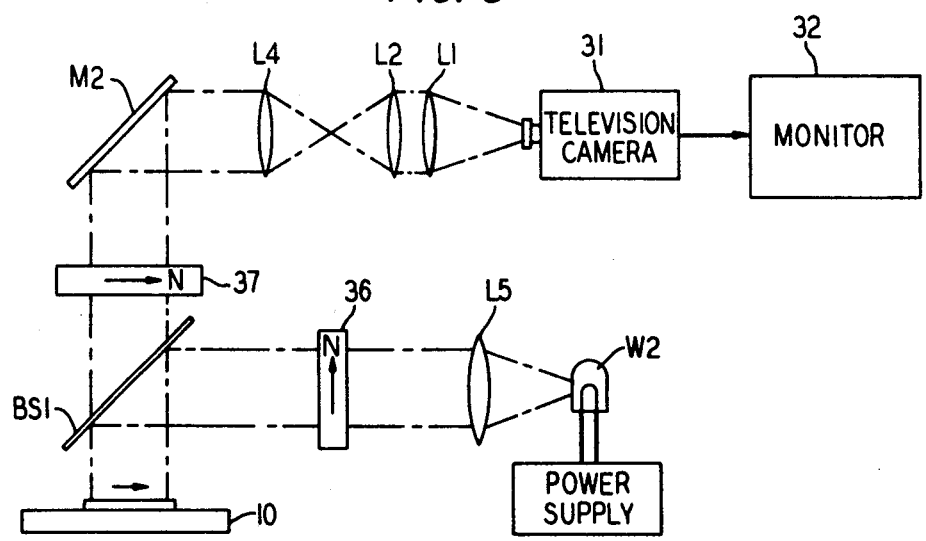
FIG. 8 is a partially schematic drawing of a second illustrative embodiment of the invention which employs polarizing optical filters.

As shown in FIG. 8, a further degree of security may be obtained by incorporating a polarizing filter element within filter region 13b on the I.D. card. Then, by polarizing the output of lamp W2, for example, by means of a polarizer 36, and placing a second polarizer (analyser) between beamsplitter BS1 and mirror M2, the hidden image or the authorized I.D. card holder will only be recovered if the polarizing material in card 10 is correctly oriented.

Thus, if a would-be forger successfully disassembles and I.D. card and then realizes that it includes a polarizing element, there is at least a 50% chance that when he reassembles the card he will incorrectly orient the polarizing material, which fact will be immediately detected by the guard. More likely, however, is the situation where the forger does not realize that the card employs a polarizing filter and merely uses non-polarizing filter material. In this latter instance, the image picked up by the TV camera will be much brighter than expected, which fact can either be detected electronically or by the guard.

Figure 9:
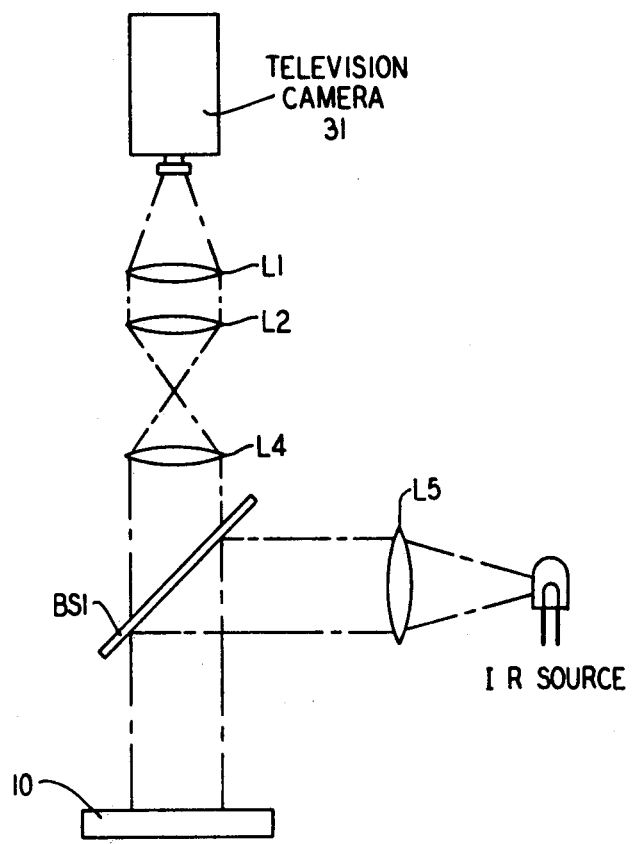
FIG. 9 is a partially schematic drawing of a third illustrative embodiment of the invention.

Of course, the card reader need not be as complex as shown in FIG. 5. FIG. 9 depicts a simplified reader which eliminates much of the optics shown in FIG. 5. Of course, in the simplified embodiment, the user will not be able to compare the picture of the card bearer with the image actually on the card. Nevertheless, the encoded data sensed by the simplified reader may provide adequate security for many applications. Likewise, the television camera can be replaced with a simple linear detector array forming a still simpler card reading device.

Figure 10:
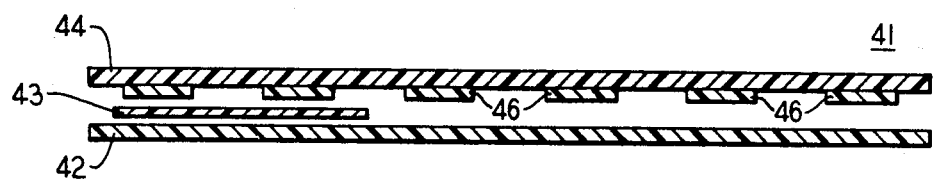
FIGS. 10 and 11 are respectively the cross-sectional and plan views of a fourth illustrative embodiment of the invention wherein retroflective material is employed to frustrate forgery of the I.D. card.
Figure 11:
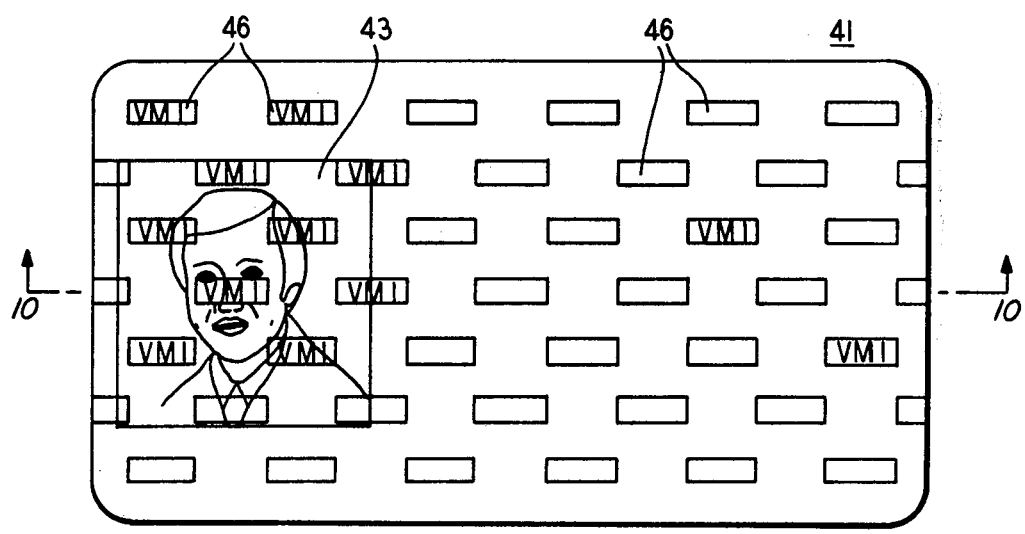

FIGS. 10 and 11 depict yet another embodiment of the invention. As shown, card 41 comprises a support member 42, a visible photograph 43 of the authorized card holder, and a substantially transparent plastic layer 44 having a plurality of retroflective indicia 46 formed therein. The indicia 46 advantageously overlay the entire card including the region bearing the photograph 43, but are not visible to the casual observer who lacks the appropriate equipment. However, when card 41 is illuminated by a collimated, on-axis ultra-violet or infra-red source, the indicia will standout on the television monitor. Thus, any attempt to forge a card by pasting another photograph over the authorized photograph will be immediately detected by the guard because the retroflective indicia will no longer overlay the photograph of the purported holder.

Coded information can be transferred to retroflective material of the type used in the instant invention by any of several known techniques. For example, by placing the corner-cube material is an ordinary typewriter (sans ribbon) and then deforming the material directly under the key, thus altering its retroflective gain. Another technique is to position a sheet of carbon paper, face up, beneath the retroflective material. Thus, as the keys are struck, the carbon is transferred to the retroflective material again selectively altering the optical gain of the material.

One skilled in the art may make various changes and substitutions without departing from the spirit and scope of the invention.

What is claimed is:

1. Apparatus for reading an identification card of the type that includes (1) visible indicia decriptive of an authorized holder; and (2) further visible indicia descriptive of said holder sandwiched between a reflecting medium and a filter which is opaque to visible radiation but substantially transparent to infra-red or ultra violet radiation, said apparatus comprising:
   a source of a beam of infra-red or ultra-violet radiation;
   means for directing said beam of infra-red or ultra-violet radiation onto the surface of said card and substantially normal thereto, thereby to cause said beam to be reflected off said reflecting medium and to be modulated by the information contained by said further visible indicia; and
   means, substantially aligned with the normal to said surface and responsive to said modulated, reflected infra-red or ultra-violet beam, for detecting said further visible indicia.

2. The apparatus according to claim 1 further comprising:
   a source of a beam of visible radiation;
   means for directing said beam of visible radiation onto said card thereby to illuminate said visible indicia whereby said detecting means detects both said visible indicia and said further visible indicia.

3. The apparatus according to claim 2 wherein said detecting means comprises a television camera having a spectral response extending into both the visible and infra-red or ultra-violet regions of the optical spectrum.

4. The apparatus according to claim 3 further comprising:
   means for multiplexing onto the beam of visible radiation reflected off said card into said television camera an image of the person presenting said card to the card-reading apparatus.

5. The apparatus according to claim 4 wherein said further visible indicia includes optically encoded digital data and said apparatus further comprises: means, connected to the output of said television camera, for generating a digital signal corresponding to said optically encoded digital data.

6. The apparatus according to claim 4 wherein said visible indicia and further visible indicia comprise a photograph of the authorized holder of said card, and said apparatus further comprises:
   means for comparing the photograph of the authorized holder detected by said infra-red or ultra-violet beam with the photograph of the authorized user detected by said visible radiation beam.

7. The apparatus according to claim 4 wherein said filter opaque to visible radiation includes a polarizing filter and said apparatus further comprises:
   a first polarizing filter associated with said infra-red or ultra-violet beam directing means; and
   a second polarizing filter at the optical input to said television camera.

* * * * *